United States Patent
Jha et al.

(10) Patent No.: US 10,231,149 B2
(45) Date of Patent: *Mar. 12, 2019

(54) RADIO RESOURCE CONTROL MESSAGING FOR DUAL CONNECTIVITY NETWORKS

(71) Applicant: Intel Corporation, Santa Clara, CA (US)

(72) Inventors: Satish Chandra Jha, Hillsboro, OR (US); Ali T. Koc, Portland, OR (US); Kathiravetpillai Sivanesan, Portland, OR (US); Rath Vannithamby, Portland, OR (US)

(73) Assignee: Intel University, Santa Clara, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/437,249

(22) Filed: Feb. 20, 2017

(65) Prior Publication Data

US 2017/0230864 A1   Aug. 10, 2017

Related U.S. Application Data

(63) Continuation of application No. 14/528,860, filed on Oct. 30, 2014, now Pat. No. 9,578,544.

(Continued)

(51) Int. Cl.
*H04W 28/08* (2009.01)
*H04W 16/32* (2009.01)
(Continued)

(52) U.S. Cl.
CPC .......... *H04W 28/08* (2013.01); *H04W 16/32* (2013.01); *H04W 40/22* (2013.01); *H04W 72/042* (2013.01); *H04W 28/18* (2013.01)

(58) Field of Classification Search
CPC ..... H04W 28/08; H04W 28/16; H04W 16/32; H04W 40/22; H04L 5/005
See application file for complete search history.

(56) References Cited

U.S. PATENT DOCUMENTS 9,578,544 B2 *  2/2017  Jha ................... H04W 28/08
2011/0134774 A1  6/2011  Pelletier et al.
(Continued)

OTHER PUBLICATIONS

"U.S. Appl. No. 14/528,860, Advisory Action dated Aug. 22, 2016", 5 pgs.

(Continued)

*Primary Examiner* — Wei Zhao
(74) *Attorney, Agent, or Firm* — Schwegman Lundberg & Woessner, P.A.

(57) ABSTRACT

A 3GPP LTE protocol enhancement may realize the full benefit of dual connectivity in Long Term Evolution (LTE) networks by providing a mechanism to carry Radio Resource Control (RRC) messages and/or Information Elements (IE)s from a Secondary Evolved Node B (SeNB) to User Equipment (UE) via Master Evolved Node B (MeNB) RRC messages. Novel downlink (DL) Common Control Channel (CCCH) and Dedicated Control Channel (DCCH) messages, and augmented messages having Information Elements (IE)s for relaying RRC messages from a SeNB to a UE via a MeNB, are defined. Modifications to ASN.1 program coding of LTE $3^{rd}$ Generation Partnership Project specifications to enable RRC messages from the MeNB to relay RRC information from the SeNB to the UE are provided. In one embodiment, the UE receives, from a MeNB, an RRC message comprising information relayed from a SeNB and interprets the RRC message for control channel and radio resource configuration information from the SeNB.

22 Claims, 4 Drawing Sheets

Related U.S. Application Data

(60) Provisional application No. 61/933,868, filed on Jan. 30, 2014.

(51) Int. Cl.
  *H04W 40/22* (2009.01)
  *H04W 72/04* (2009.01)
  *H04W 28/18* (2009.01)

(56) References Cited

U.S. PATENT DOCUMENTS

| | | | |
|---|---|---|---|
| 2011/0222428 A1* | 9/2011 | Charbit | H04B 7/15557 370/252 |
| 2012/0057523 A1 | 3/2012 | Ji et al. | |
| 2014/0177560 A1* | 6/2014 | Guo | H04W 72/1268 370/329 |
| 2015/0215923 A1 | 7/2015 | Jha et al. | |

OTHER PUBLICATIONS

"U.S. Appl. No. 14/528,860, Examiner Interview Summary dated Jul. 27, 2016", 3 pgs.

"U.S. Appl. No. 14/528,860, Final Office Action dated Jun. 24, 2016", 19 pgs.

"U.S. Appl. No. 14/528,860, Non Final Office Action dated Mar. 17, 2016", 17 pgs.

"U.S. Appl. No. 14/528,860, Notice of Allowance dated Oct. 6, 2016", 9 pgs.

"U.S. Appl. No. 14/528,860, Response filed Aug. 5, 2016 to Final Office Action dated Jun. 24, 2016", 10 pgs.

"U.S. Appl. No. 14/528,860, Response filed Sep. 20, 2016 to Advisory Office Action dated Aug. 22, 2016", 10 pgs.

"U.S. Appl. No. 14/528,860, Response filed May 26, 2016 to Non Final Office Action dated Mar. 17, 2016", 10 pgs.

* cited by examiner

RADIO RESOURCE CONTROL MESSAGING FOR DUAL CONNECTIVITY NETWORKS

CROSS-REFERENCE TO RELATED APPLICATIONS

The present application is a continuation of U.S. patent application Ser. No. 14/528,860, filed on Oct. 30, 2014, which application claims the benefit of U.S. Provisional Application No. 61/933,868, filed Jan. 30, 2014, each of which are hereby incorporated by reference in their entirety.

TECHNICAL FIELD

Examples generally relate to Long Term Evolution (LTE) networks. One or more examples relate to the implementation of Radio Resource Control (RRC) messaging in LTE dual connectivity network architecture(s).

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Dual connectivity is a new innovative network architecture that allows a User Equipment (UE) to connect with more than one base station and/or network cell simultaneously. The UE can connect with a Master Cell Group (MCG) and a Secondary Cell Group (SCG) at the same time by connecting to a Master Evolved Node B (MeNB) and a Secondary Evolved Node B (SeNB) at the MCG and SCG respectively.

The transmission of RRC messages via the SeNB is not supported by proposed standards for Dual Connectivity. Thus, in order to realize the full benefit of proposed dual connectivity networks, there is now a need for enhancements in current 3GPP LTE standards to coordinate and align configuration and other operations by including RRC configuration information for SeNBs in MeNB RRC messaging protocols.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refer to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a User Equipment (UE), a wireless communication device or some other similar terminology known in the art. Dual Connectivity in wireless cellular networks has been approved by standards bodies for 3GPP LTE advanced releases. Dual connectivity allows a UE to simultaneously connect with more than one cell or eNB. A UE may simultaneously connect to a MeNB and a SeNB.

The 3GPP standards body has agreed that the transmission of RRC messages via a SeNB is not supported. Over the air RRC messages will be sent to a UE only by a MeNB. In other words, the RRC messages or RRC message information Element (IE)s from the SeNB will be carried to the UE by RRC messages from the MeNB in a message container. However, a mechanism for including the RRC configurations or RRC IEs of the SeNB in MeNB RRC messages for transfer to a dual UE is not defined. Modification of the MeNB RRC message structure is needed to support SeNB communications with UEs in Dual Connectivity network architectures.

A method and apparatus for supporting SeNB communications with UEs in a Dual Connectivity network are disclosed in FIGS. 1-5. Mechanisms for carrying the RRC messages having configuration information or IEs from the SeNB to the UE via the MeNB RRC messages are disclosed. Modifications to the ASN.1 program coding of the 3GPP specification to enable RRC messages from the MeNB to carry the RRC messages and IEs of the SeNB to the UE are defined.

Figure 1:
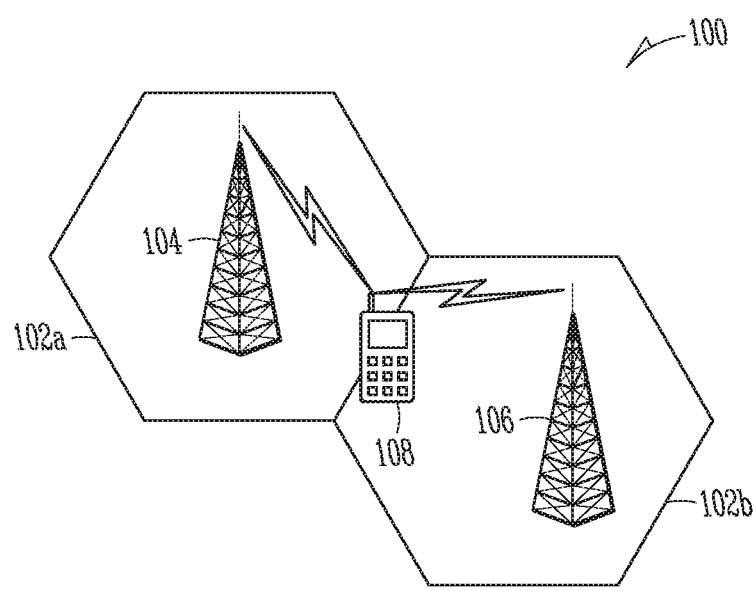
FIG. 1 shows a high level block diagram illustrating an example of dual connectivity in a cellular network, according to some embodiments.

FIG. 1 shows a high level block diagram illustrating an example of dual connectivity in a cellular network 100, according to some embodiments. Traditional LTE systems do not support UE 108 connectivity to two eNBs simultaneously. In other words, resource management and scheduling for a UE 108 in traditional LTE network architectures is handled by a single eNB. In dual connectivity, however, the UE 108 may now connect to two eNBs (MeNB 104, SeNB 106) simultaneously, where resource management and scheduling is performed by the two independent eNBs (MeNB 104. SeNB 106).

Cell 102a, belonging to a MCG, comprises MeNB 104. Cell 102b, belonging to a SCG, comprises SeNB 106. UE 108 is simultaneously connected to MeNB 104 and SeNB 106. MeNB 104 and SeNB 106 may communicate via an X2 interface protocol.

Wireless cellular communication networks incorporate a number of wireless terminal devices and a number of base stations for the purpose of providing communications services such as telephony, data, video, messaging, chat and broadcast. A number of wireless terminals can be connected to a serving cell that is controlled by a base station (BS). Typical access schemes employed in widely used cellular networks include Frequency Division Multiple Access (FDMA), Time Division Multiple Access (TDMA), Code Division Multiple Access (CDMA), Orthogonal Frequency Division Multiple Access (OFDMA), Single-Carrier Frequency Division Multiple Access (SC-FDMA) or combinations thereof. The base station (BS) may also be called a NodeB in the Universal Mobile Telecommunications System (UMTS) specified by the Third 3GPP, a base transceiver system (BTS), an access point (AP), or some other equivalent terminology. As improvements of networks are made, the NodeB functionality evolves, so a NodeB is also referred to as an evolved NodeB (eNodeB, eNB, MeNB 104 or SeNB 106) in the 3GPP Long Term Evolution (LTE) system. In general, eNB (MeNB 104, SeNB 106) hardware, when deployed, is fixed and stationary.

In contrast to the eNB (MeNB 104, SeNB 106), the wireless terminal devices can be portable hardware. The wireless terminal device is commonly referred to as a User Equipment (UE), a mobile station, a cellular phone, a personal digital assistant (PDA), a wireless modem card, and so on. Uplink (UL) communication refers to communication from a fixed or mobile UE to the eNB (MeNB 104, SeNB 106), whereas downlink (DL) communication refers to communication from the eNB (MeNB 104, SeNB 106) to the fixed or mobile UE. Each eNB (MeNB 104, SeNB 106) contains radio frequency transmitter(s) and receiver(s) used to communicate directly with the mobiles, which move either freely around it or are at a fixed location. Similarly, each UE 108 contains radio frequency transmitter(s) and receiver(s) used to communicate directly with the eNB (MeNB 104, SeNB 106).

Long Term Evolution (LTE) wireless networks, also known as Evolved Universal Terrestrial Radio Access Networks (E-UTRAN), are being standardized by the 3GPP working groups (WGs). OFDMA and SC-FDMA access schemes are employed for the downlink (DL) and uplink (UL) of E-UTRAN, respectively as part of the Evolved Universal Terrestrial Radio Access (E-UTRA). User Equipments (UEs) are time, frequency or code multiplexed on a physical uplink shared channel (PUSCH) for transmitting Uplink Shared Channel (UL-SCH) data, and a fine time and frequency synchronization between UEs 108 guarantees optimal intra-cell orthogonality. In case the UE 108 is not UL synchronized, it may initiate the random access procedure for synchronization by transmitting a random access preamble on the Physical Random Access Channel (PRACH). The base station provides back some allocated UL resource and timing advance information to allow the UE 108 to transmit on the PUSCH. Downlink control-plane and user-plane data are scheduled by the Physical Downlink Control Channel (PDCCH) or the Enhanced Physical Downlink Control Channel (EPDCCH) and the actual data is transmitted on the Physical Downlink Shared Channel (PDSCH). The general operations of the physical channels are described in the EUTRA specifications, for example: "3rd Generation Partnership Project; Technical Specification Group Radio Access Network; Evolved Universal Terrestrial Radio Access (E-UTRA); Physical Channels and Modulation (TS 36.211 Release 8 or later)."

The explosion in data traffic in current cellular networks has motivated the need for a rapid expansion of network capacity to cope with this demand. In addition, it has been observed that the majority of data/video traffic occurs in hotspot and indoor scenarios, where data-hungry smartphone applications overwhelm existing networks. As a result, a major initiative in LTE-Advanced commenced in the LTE Release 10 standard with the introduction of a heterogeneous network (HetNet) architecture consisting of small cells, controlled by low power eNB (MeNB 104, SeNB 106) nodes, in addition to macro cells controlled by high power eNB (MeNB 104, SeNB 106) nodes. These low power nodes are deployed in traffic hot spots and outdoor/indoor locations to boost capacity and/or improve coverage in areas with spotty macro coverage. Several features have been introduced in LTE Releases 10 and 11 to support efficient HetNet operation with a sparse deployment of small cells including enhanced inter-cell interference coordination (e-ICIC), cooperative multipoint (COMP) transmission/reception and carrier aggregation (CA).

To improve network capacity of 3GPP Advanced LTE systems, the overall coverage area of an eNB (MeNB 104, SeNB 106) may be partitioned into multiple (e.g., three) smaller areas. In some embodiments, each smaller area may be served by a respective eNB (MeNB 104, SeNB 106) subsystem. In 3GPP, the term "cell" can refer to the smallest coverage area of an eNB (MeNB 104, SeNB 106) and/or an eNB subsystem serving this coverage area.

Thus, a 3GPP Advanced LTE system eNB (MeNB 104, SeNB 106) embodied herein may provide communication coverage for a macro cell, a pico cell, a femto cell, and/or other types of cells. In one embodiment, MeNB 104 may be a macro eNB for macro cell 102a, and SeNB 106 may be a pica eNB for a pica cell 102b. In other embodiments, MeNB 104 may be a home eNB (HeNB) for a femto cell. In some embodiments, Radio Resource Control Messaging in Dual Connectivity Networks operates to offload traffic and data from a large cell to a smaller secondary cell. For example, in one embodiment, a macro cell may offload traffic and data to a pico cell. In another embodiment, a home cell may offload traffic and data to a femto cell.

One challenge for 3GPP LTE networks is that the transmission of RRC messages to a UE 108 via a SeNB 106 is not supported. As a result, the SeNB 106 may not be able to transmit dual connectivity configuration information or other operational information for supporting Advanced LTE network capabilities (i.e., such as offloading traffic to a small secondary cell) directly to the UE 108. Rather, FIGS. 2-6 describe some example embodiments for the SeNB 106 to communicate its dual connectivity configuration information or other operational information to the MeNB 104, which then relays the information to the UE 108.

Figure 2:
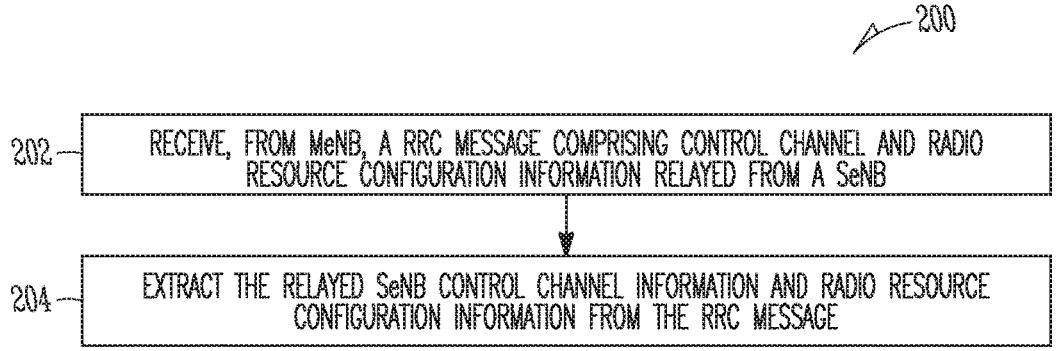
FIG. 2 is a high level overview flowchart of Radio Resource Control Messaging in Dual Connectivity Networks, according to some embodiments.

FIG. 2 is a high level overview flowchart of Radio Resource Control Messaging in Dual Connectivity Networks 200, according to some embodiments. In one embodiment, novel Downlink (DL) Common Control Channel (CCCH) and DL Dedicated Control Channel (DCCH) messages for an MeNB (e.g., MeNB 104) to carry CCCH and DCCH Messages and/or IEs from an SeNB (e.g., SeNB 106) to a UE (e.g., UE 108) are defined. In another embodiment, new fields for augmenting existing MeNB DL CCCH and DL DCCH messages are defined for relaying the DL CCCH and DCCH messages and/or IEs from the SeNB to the UE.

The DL-CCCH-Message class is the set of RRC messages that may be sent from an Evolved Node B (eNB) to the UE on the downlink CCCH logical channel. In the first embodiment, Radio Resource Control Messaging for Dual Connectivity Networks conveys information from an SeNB to a UE in new message types comprising containers to relay information from the SeNB to the UE via the MeNB. In an exemplary embodiment, a new "c1-Senb" message includes the enhancements shown in bold below:

```
-- ASN1START
DL-CCCH-Message ::= SEQUENCE {
    message             DL-CCCH-MessageType,
    senbMessage         DL-CCCH-SeNBMessageType    OPTIONAL    -- Need ON
}
DL-CCCH-MessageType ::= CHOICE {
    c1                         CHOICE {
        rrcConnectionReestablishment          RRCConnectionReestablishment,
        rtcConnectionReestablishmentReject    RRCConnectionReestablishmentReject,
        rrcConnectionReject                   RRCConnectionReject,
        rrcConnectionSetup                    RRCConnectionSetup
    },
    messageClassExtensionSEQUENCE { }
}
DL-CCCH-SeNBMessageType ::= CHOICE {
    c1-Senb                    CHOICE {
        rrcConnectionReestablishment          RRCConnectionReestablishment,
        rrcConnectionReestablishmentReject    RRCConnectionReestablishmentReject,
        rrcConneetionReject                   RRCConnectionReject,
        rrcConnectionSetup                    RRCConnectionSetup
    },
    messageClassExtension    SEQUENCE { }
}
-- ASN1STOP
```

Likewise, the DL-DCCH-Message class is the set of RRC messages that may be sent from an eNB to the UE, on the downlink DCCH logical channel. New "c2-Senb" and "C2-Dual-Senb" messages include the IE enhancements shown in bold below to relay information from the SeNB to the UE via the MeNB:

```
-- ASN1START
DL-DCCH-Message ::= SEQUENCE {
    message             DL-DCCH-MessageType
    senbMessage         DL-DCCH-SeNBNMessageType    OPTIONAL    -- Need ON
}
DL-DCCH-MessageType ::= CHOICE {
    c1                         CHOICE {
        csfbParametersResponseCDMA2000        CSFBParametersResponseCDMA2000,
        dlInformationTransfer                 DLInformationTransfer,
        handoverFromEUTRAPreparationRequest   HandoverFromEUTRAPreparationRequest,
        mobilityFromEUTRACommand              MobilityFromEUTRACommand,
        rrcConnectionReconfiguration          RRCConnectionReconfiguration,
        rrcConnectionRelease                  RRCConnectionRelease,
        securityModeCommand                   SecurityModeCommand,
        ueCapabilityEnquiry                   UECapabilityEnquiry,
        counterCheck                          CounterCheck,
        ueInformationRequest-r9               UEInformationRequest-r9,
        loggedMeasurementConfiguration-r10    LoggedMeasurementConfiguration-r10,
        rnReconfiguration-r10                 RNReconfiguration-r10,
        spare4 NULL,
        spare3 NULL, spare2 NULL, spare1 NULL
    },
    messageClassExteasionSEQUENCE { }
}
DL-DCCH-SeNBMessageType ::= CHOICE {
    c1-Senb                    CHOICE {
        dlInformationTransfer                 DLInformationTransfer,
        rrcConnectionReconfiguration          RRCConnectionReconfiguration,
        rrcConnectionRelease                  RRCConnectionRelease,
        securityModeCommand                       SecurityModeCommand,
        ueCapabilityEnquiry                   UECapabilityEnquiry,
        counterCheck                          CounterCheck,
        ueInformationRequest-r9               UEInformationRequest-r9,
```

```
        rnReconfiguration-r10              RNReconfiguration-r10,
    },
        messageClassExtension    SEQUENCE { }
}
-- ASN1STOP
```

In another embodiment, new fields for augmenting existing DL CCCL and DCCH messages to convey information from an SeNB to a UE are defined. New "c2-Senb" and "C2-Dual-Senb" messages are defined as new fields in the existing DL CCCL and DCCH messages of MeNB which include the enhancements shown in bold below:

```
-- ASN1START
DL-CCCH-Message ::= SEQUENCE {
    message              DL-CCCH-MessageType,
}
DL-CCCH-MessageType ::= CHOICE {
    c1                        CHOICE {
        rrcConnectionReestablishment        RRCConnectionReestablishment,
        rrcConnectionReestablishmentReject  RRCConnectionReestablishmentReject,
        rrcConnectionReject                 RRCConnectionReject,
        rrcConnectionSetup                  RRCConnectionSetup
    },
    messageClassExtension CHOICE {
    C2-Senb                              CHOICE {
        rrcConnectionReestablishment        RRCConnectionReestablishment,
        rrcConnectionReestablishmentReject  RRCConnectionReestablishmentReject,
        rrcConnectionReject                 RRCConnectionReject,
        rrcConnectionSetup                  RRCConnectionSetup
    }                  OPTIONAL, -- Need ON
        messageClassExtensionFuture-r12    SEQUENCE { }
    }
}
-- ASN1STOP
``` and, an example embodiment of an added IE container:

```
-- ASN1START
DL-DCCH-Message ::= SEQUENCE {
    message              DL-DCCH-MessageType
}
DL-DCCH-MessageType ::= CHOICE {
    c1                        CHOICE {
        csfbParametersResponseCDMA2000          CSFBParametersResponseCDMA2000,
        dlInformationTrartsfer                  DLInformationTransfer,
        handoverFromEUTRAPreparationRequest     HandoverFromEUTRAPreparationRequest,
        mobilityFromEUTRACommand                MobilityFromEUTRACommand,
        rrcConnectionReconfiguration            RRCConnectionReconfiguration,
        rrcConnectionRelease                    RRCConnectionRelease,
        securityModeCommand                     SecurityModeCommand,
        ueCapabilityEnquiry                     UECapabilityEnquiry,
        counterCheck                            CounterCheck,
        ueInformationRequest-r9                 UEInformationRequest-r9,
        loggedMeasurementConfiguration-r10      LoggedMeasurementConfiguration-r10,
        mReconfiguration-r10                    RNReconfiguration-r10,
        spare4 NULL,
        spare3 NULL, spare2 NULL, spare1 NULL
    },
    C2-Dual           SEQUENCE {
    C2-Dual-Menb                        CHOICE {
        csfbParametersResponse CDMA2000         CSFBParametersResponseCDMA2000,
        dlInformationTransfer                   DLInformationTransfer,
        handoverFromEUTRAPreparationRequest     HandoverFromEUTRAPreparationRequest,
        mobilityFromEUTRACommand                MobilityFromEUTRACommand,
        rrcConnectionReconfiguration            RRCConnectionReconfiguration,
        rrcConnetionRelease                     RRCConnectionRelease,
        securityModeCommand                     SecurityModeCommand,
        ueCapabilityEnquiry                     UECapabilityEnquiry,
        counterCheck                            CounterCheck,
        ueInformationRequest-r9                 UEInformationRequest-r9,
        loggedMeasurementConfiguration-r10      LoggedMeasurementConfiguration-r10,
        rnReconfiguration-r10                   RNReconfiguration-r10,
        spare4 NULL,
        spare3 NULL, spare2 NULL, spare1 NULL
    }                                            OPTIONAL,   -- Need ON
```

```
C2-Dual-Senb                    CHOICE {
    dlInformationTransfer              DLInformationTransfer,
    rrcConnectionReconfiguration       RRCConnectionReconfiguration,
    rrcConnectionRelease               RRCConnectionRelease,
    securityModeCommand                SecurityModeCommand,
    ueCapabilityEnquiry                UECapabilityEnquiry,
    counterCheck                       CounterCheck,
    ueInformationRequest-r9            UEInfonnationRequest-r9,
    rnReconfiguration-r10              RNReconfiguration-r10,
    }                       OPTIONAL,  -- Need ON
}
    messageClassExtensionSEQUENCE { }
}
-- ASN1STOP
```

When the new and/or augmented messages detailed above have been defined in a dual connectivity network architecture, the UE may receive a RRC message from its MeNB comprising information relayed from a SeNB in operation 202. The UE then interprets the RRC message by extracting control information and/or radio resource configuration information relayed from the SeNB in operation 204. After receiving specific RRC messages and/or IEs from the MeNB 104, the UE 108 identifies these RRC messages by a name, type, or unique LCID as having SeNB 106 radio link configuration information for the UE 108 that has been forwarded by the MeNB 104, although these messages and/or IEs are received from the MeNB 104. Based on the type and/or name of RRC message and/or IE, the UE 108 can identify that these messages and/or IEs received from the MeNB 104 are actually relayed from the SeNB 106. FIG. 2 operations are depicted as a messaging procedure diagram in FIG. 3.

Figure 3:
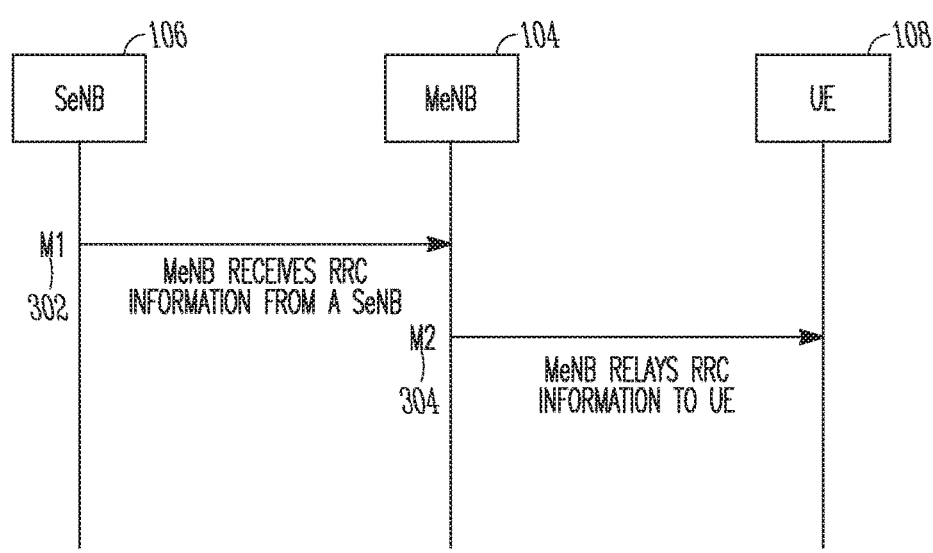
FIG. 3 illustrates an exemplary procedure for Radio Resource Control Messaging in Dual Connectivity Networks, according to some embodiments.

FIG. 3 illustrates an exemplary procedure for Radio Resource Control Messaging in Dual Connectivity Networks 300, according to some embodiments. A MeNB 104 may be arranged to receive message M1 302 comprising RRC information from an SeNB 106. The MeNB 104 may be arranged to transmit message M2 304, relaying the RRC information from the SeNB 106 to a UE 108. The messages, M1 302 and M2 304, may be structured as newly defined messages, or IEs added to existing LTE messaging structures. Thus, transmission of RRC messages from the SeNB 106 to a UE 108 is supported by relaying the messages to the UE 108 through the MeNB 104.

Figure 4:
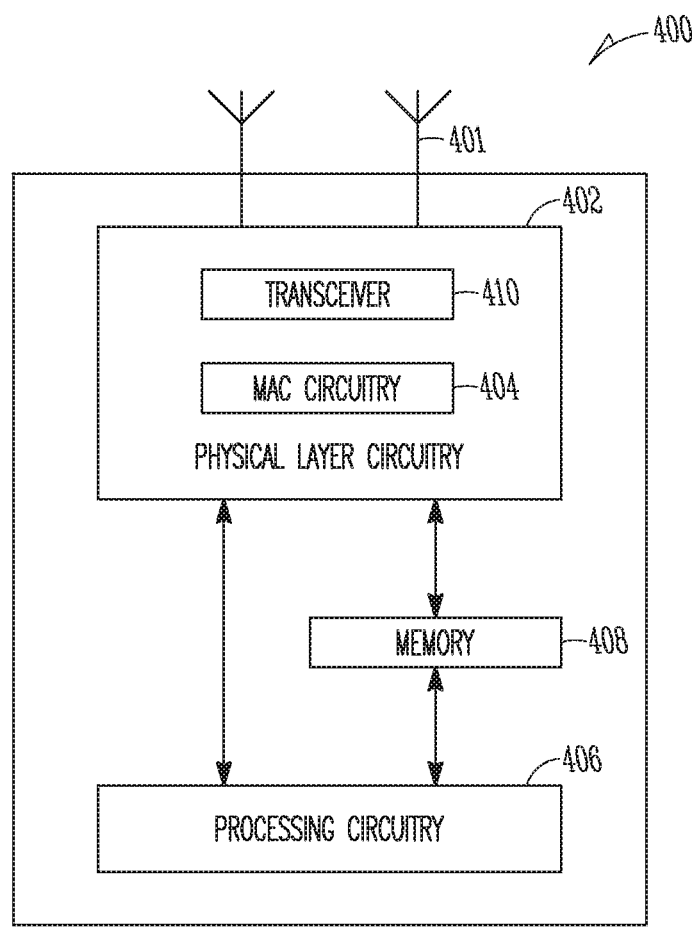
FIG. 4 shows a functional diagram of an exemplary communication station, in accordance with some embodiments.

FIG. 4 shows a functional diagram of an exemplary communication station 400 in accordance with some embodiments. FIG. 4 illustrates a functional block diagram of a communication station 400 that may be suitable for use as a MeNB 104 (FIG. 1) or SeNB 106 (FIG. 1) in accordance with some embodiments. The communication station 400 may also be suitable for use as a handheld device, mobile device, cellular telephone, smartphone, tablet, netbook, wireless terminal, laptop computer, femtocell, HDR subscriber station, access point, access terminal, or other PCS device.

The communication station 400 may include physical layer circuitry 402 having a transceiver 410 for transmitting and receiving signals to and from other communication stations using one or more antennas 401. The physical layer circuitry 402 may also comprise medium access control (MAC) circuitry 404 for controlling access to the wireless medium. The communication station 400 may also include processing circuitry 406 and memory 408 arranged to perform the operations described herein. In some embodiments, the physical layer circuitry 402 and the processing circuitry 406 may be configured to perform operations detailed in FIGS. 2 and 3.

In accordance with some embodiments, the MAC circuitry 404 may be arranged to contend for a wireless medium and configure frames or packets for communicating over the wireless medium, and the physical layer circuitry 402 may be arranged to transmit and receive signals. The physical layer circuitry 402 may include circuitry for modulation/demodulation, up-conversion/down-conversion, filtering, amplification, etc. In some embodiments, the processing circuitry 406 of the communication station 400 may include one or more processors. In some embodiments, two or more antennas 401 may be coupled to the physical layer circuitry 402 arranged for sending and receiving signals. The memory 408 may store information for configuring the processing circuitry 406 to perform operations for configuring and transmitting message frames and performing the various operations described herein. The memory 408 may comprise any type of memory, including non-transitory memory, for storing information in a form readable by a machine (e.g., a computer). For example, the memory 408 may comprise a computer-readable storage device, read-only memory (ROM), random-access memory (RAM), magnetic disk storage media, optical storage media, flash-memory devices, and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 400 may include one or more antennas 401. The antennas 401 may comprise one or more directional or omnidirectional antennas, including, for example, dipole antennas, monopole antennas, patch antennas, loop antennas, micro-strip antennas, or other types of antennas suitable for transmission of RF signals. In some embodiments, instead of two or more antennas 401, a single antenna 401 with multiple apertures may be used. In these embodiments, each aperture may be considered a separate antenna 401. In some multiple-input multiple-output (MIMO) embodiments, the antennas 401 may be effectively separated for spatial diversity and the different channel characteristics that may result between each of the antennas 401 and the antennas of a transmitting station.

In some embodiments, the communication station 400 may include one or more of a keyboard, a display, a non-volatile memory port, multiple antennas, a graphics processor, an application processor, speakers, and other mobile device elements (not shown). The display may be a Liquid Crystal Display (LCD) screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of the communication station 400 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include Read-Only-Memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory 408.

Figure 5:
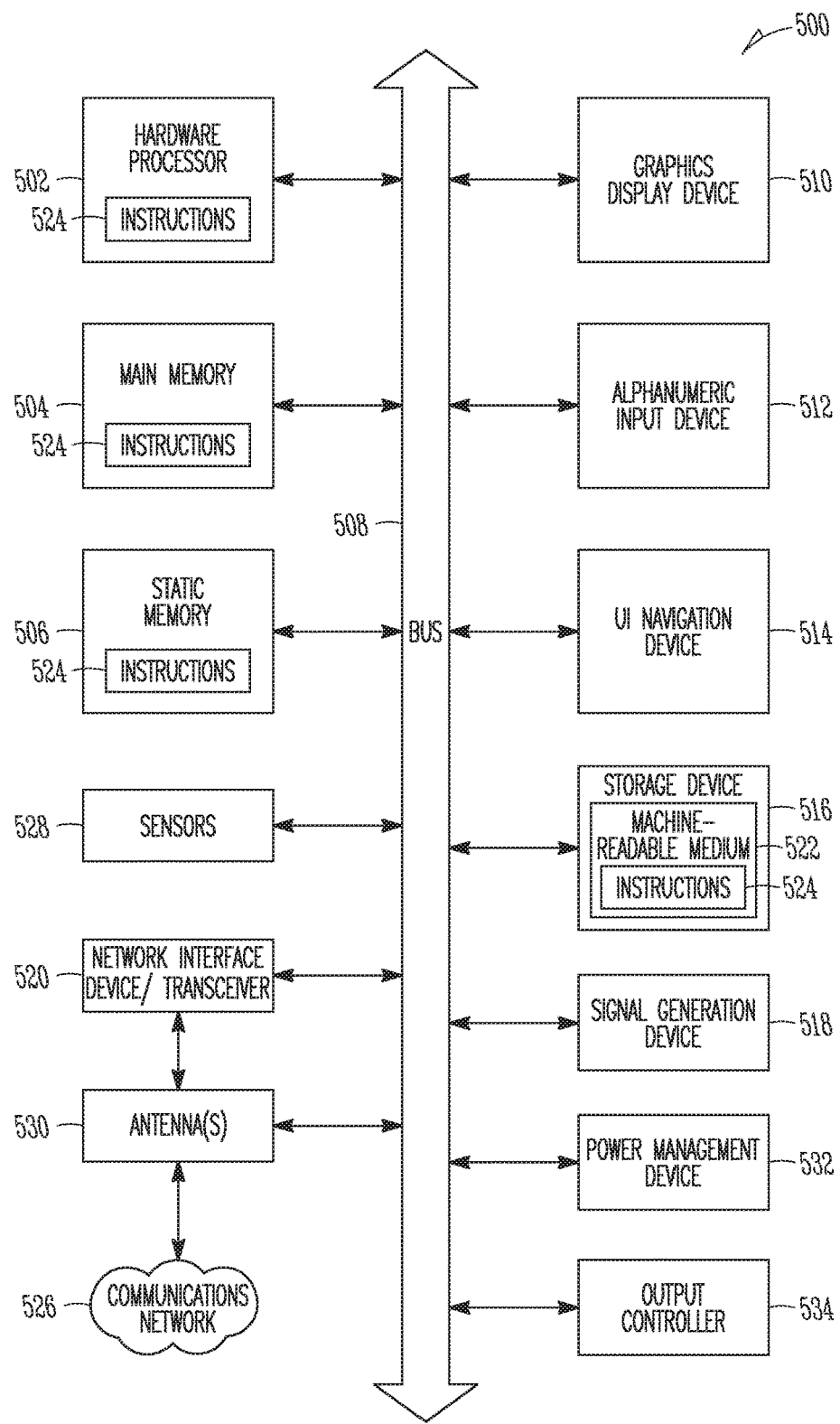
FIG. 5 shows a block diagram of an example of a machine upon which any of one or more techniques (e.g., methods) discussed herein may be performed.

FIG. 5 illustrates a block diagram of an example of a machine 500 upon which any one or more of the techniques (e.g., methodologies) discussed herein may be performed. In one embodiment, the machine 500 may be a UE 108. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while a single machine 500 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), a network interface device/transceiver 520 coupled to antenna(s) 530, and one or more sensors 528, such as a global positioning system (GPS) sensor, compass, accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In one embodiment, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions 524. Non-limiting machine readable medium 522 examples may include solid-state memories, and optical and magnetic media. In an example, a massed machine readable medium comprises a machine readable medium 522 with a plurality of particles having resting mass. Specific examples of massed machine readable media may include: non-volatile memory, such as semiconductor memory devices (e.g., Electrically Programmable Read-Only-Memory (EPROM), or Electrically Erasable Programmable Read-Only-Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks 526 may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas 530 to connect to the communications network 526. In an example, the network interface device/transceiver 520 may include a plurality of antennas 530 to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 524 for execution by the machine 500, and includes digital or analog communications signals or other intangible media to facilitate communication of such software.

What is claimed is:

1. An apparatus of a user equipment (UE), the apparatus comprising:
   processing circuitry, the processing circuitry configured to:
   decode a Radio Resource Control (RRC) message originating from a Master Evolved Node-B (MeNB), the RRC message comprising radio resource configuration information of a Secondary Evolved Node-B (SeNB);
   extract the SeNB radio resource configuration information from the RRC message; and
   configure the UE for dual connectivity with the MeNB and the SeNB, according to the extracted SeNB radio resource configuration information, to utilize radio resources of both the MeNB and the SeNB during the dual connectivity; and
   memory configured to store the extracted SeNB radio resource configuration information.

2. The apparatus of claim 1, wherein the processing circuitry is further configured to:
   decode the RRC message, wherein the RRC message further comprises control channel information, the radio resource configuration information and the control channel information for configuring the UE when traffic and data are offloaded from a large cell to a small cell.

3. The apparatus of claim 1, wherein the radio resource configuration information comprises channel configuration information for the dual connectivity.

4. The apparatus of claim 1, wherein the RRC message is a downlink (DL) control channel (DCCH) message.

5. The apparatus of claim 4, wherein the DCCH message is a RRC_Connection_Reconfiguration message container that relays the radio resource configuration information of the SeNB to the UE.

6. The apparatus of claim 1, wherein the RRC message is a DL common control channel (CCCH) message.

7. The apparatus of claim 1, further comprising transceiver circuitry coupled to the processing circuitry; and one or more antennas coupled to the transceiver circuitry.

8. The apparatus of claim 7, wherein the transceiver circuitry is configured to receive the RRC message from the MeNB on a downlink common control channel (CCCH).

9. The apparatus of claim 7, wherein the transceiver circuitry is configured to receive the RRC message from the MeNB on a downlink dedicated control channel (DCCH).

10. An apparatus of a Master Evolved Node-B (MeNB), the apparatus comprising:
    processing circuitry, the processing circuitry configured to:
    decode radio resource configuration information of a Secondary Evolved Node-B (SeNB); and
    encode a message container for transmission to a user equipment (UE),
    wherein the message container includes configuration information of the MeNB and is for relaying the radio resource configuration information of the SeNB to the UE, to configure the UE for dual connectivity with the MeNB and the SeNB according to the relayed configuration information of the SeNB, to allow the UE to utilize radio resources of both the MeNB and the SeNB during the dual connectivity; and
    memory configured to store the radio resource configuration information of the SeNB.

11. The apparatus of claim 10, further comprising transceiver circuitry coupled to the processing circuitry; and one or more antennas coupled to the transceiver circuitry,
    wherein the transceiver circuitry is configured to receive the radio resource configuration information from the SeNB.

12. The apparatus of claim 10, wherein the RRC message further comprises control channel information, the radio resource configuration information and the control channel information for configuring the UE when traffic and data are offloaded from a large cell to a small cell.

13. The apparatus of claim 10, wherein the radio resource configuration information comprises channel configuration information for the dual connectivity.

14. The apparatus of claim 10, wherein the message container is a downlink (DL) control channel (DCCH) message.

15. The apparatus of claim 14, wherein the DCCH message is a RRC_Connection_Reconfiguration message.

16. The apparatus of claim 10, wherein the message container is a DL common control channel (CCCH) message.

17. A non-transitory computer readable storage device including instructions stored thereon, which when executed by one or more processors of a User Equipment (UE), cause the UE to perform operations to:
    receive a Radio Resource Control (RRC) message from a Master Evolved Node-B (MeNB) on a dedicated control channel;

decode the RRC message to obtain radio resource configuration information of a Secondary Evolved Node-B (SeNB);

extract the SeNB radio resource configuration information from the RRC message; and configure the UE for dual connectivity with the MeNB and the SeNB, according to the extracted SeNB radio resource configuration information, to utilize radio resources of both the MeNB and the SeNB during the dual connectivity.

18. The non-transitory computer readable storage device of claim 17, wherein the RRC message further comprises control channel information, the radio resource configuration information and the control channel information for configuring the UE when traffic and data are offloaded from a large cell to a small cell.

19. The non-transitory computer readable storage device of claim 17, wherein the radio resource configuration information comprises channel configuration information for the dual connectivity.

20. The non-transitory computer readable storage device of claim 17, wherein the RRC message is a downlink (DL) control channel (DCCH) message.

21. The non-transitory computer readable storage device of claim 20, wherein the DCCH message is a RRC_Connection_Reconfiguration message container that relays the radio resource configuration information of the SeNB to the UE.

22. The non-transitory computer readable storage device of claim 17, wherein the RRC message is a DL common control channel (CCCH) message.

* * * * *

UNITED STATES PATENT AND TRADEMARK OFFICE
CERTIFICATE OF CORRECTION

PATENT NO. : 10,231,149 B2
APPLICATION NO. : 15/437249
DATED : March 12, 2019
INVENTOR(S) : Jha et al.

Page 1 of 1

It is certified that error appears in the above-identified patent and that said Letters Patent is hereby corrected as shown below:

On the Title Page

Item [73], delete "University," and insert --Corporation,-- therefor

Signed and Sealed this
Fourteenth Day of April, 2020

Andrei Iancu
*Director of the United States Patent and Trademark Office*